United States Patent [19]
Davis

[11] 3,719,555
[45] March 6, 1973

[54] IRRADIATION TEST FACILITY
[75] Inventor: Grover L. Davis, Fremont, Calif.
[73] Assignee: General Electric Company, San Jose, Calif.
[22] Filed: Oct. 18, 1968
[21] Appl. No.: 771,087

[52] U.S. Cl. .................................176/17, 176/15
[51] Int. Cl. .............................................G21g 1/00
[58] Field of Search......................176/12, 15, 17, 16

[56] References Cited

UNITED STATES PATENTS

| | | | |
|---|---|---|---|
| 3,140,980 | 7/1964 | Breazeale et al. | 176/17 |
| 3,144,392 | 8/1964 | Chabassier et al. | 176/18 X |
| 3,238,107 | 3/1966 | Leyse et al. | 176/18 X |
| 3,250,684 | 5/1966 | Bochirol et al. | 176/15 X |
| 3,276,963 | 10/1966 | Pearce et al. | 176/18 |
| 3,290,220 | 12/1966 | Mitault et al. | 176/15 |
| 3,412,250 | 11/1968 | Arragon et al. | 176/15 X |

FOREIGN PATENTS OR APPLICATIONS

| | | | |
|---|---|---|---|
| 944,049 | 12/1963 | Great Britain | 176/18 |
| 1,087,507 | 10/1967 | Great Britain | 176/15 |

Primary Examiner—Carl D. Quarforth
Assistant Examiner—Harvey E. Behrend
Attorney—Ivor J. James, Jr., Samuel E. Turner, Frank L. Neuhauser, Oscar B. Waddell, Melvin M. Goldenberg and John R. Duncan

[57] ABSTRACT

A test facility for use with a nuclear reactor to test instruments, fuel samples, etc., in a reactor environment under varying conditions is disclosed. This facility includes an insulated, gamma ray heated, pressurized boiler and reflux condenser system to provide an inherently stable temperature control system. Thus, the test environment may be varied with respect to temperature and pressure. In addition, test samples may be subjected to a boiling water environment, closely duplicating conditions in the core of a boiling water type power reactor.

6 Claims, 12 Drawing Figures

INVENTOR:
GROVER L. DAVIS
BY John R Duncan
ATTORNEY

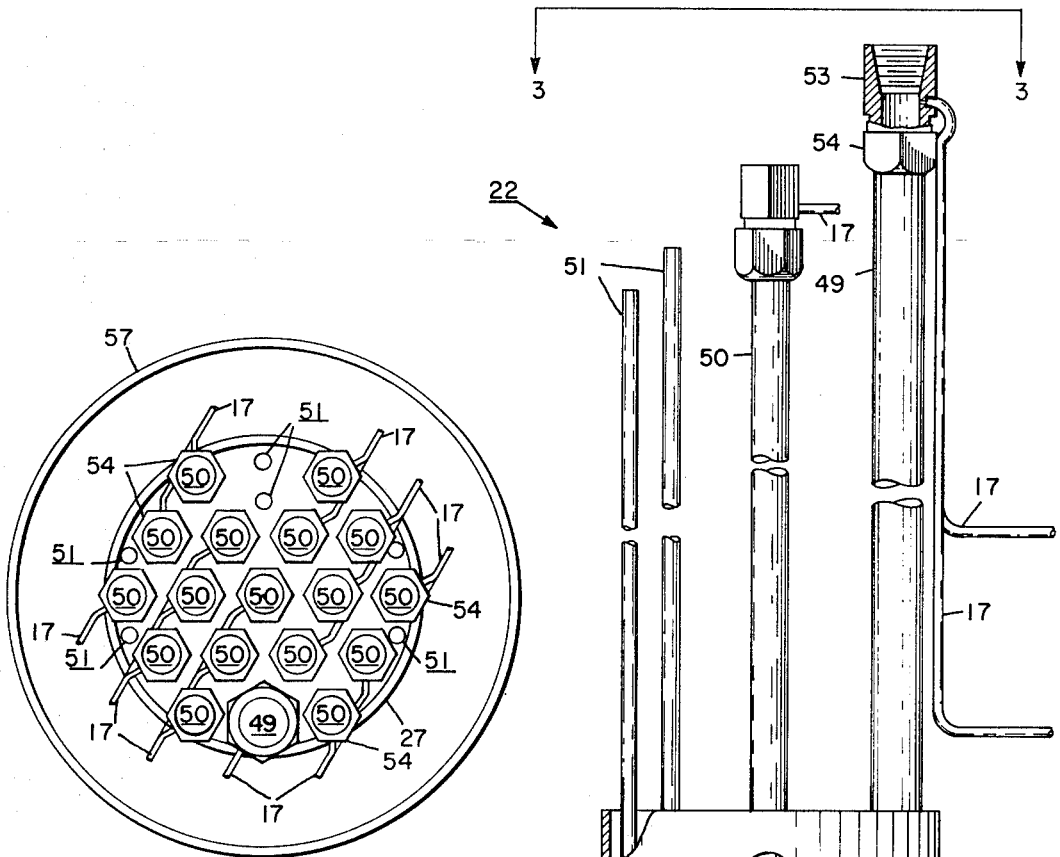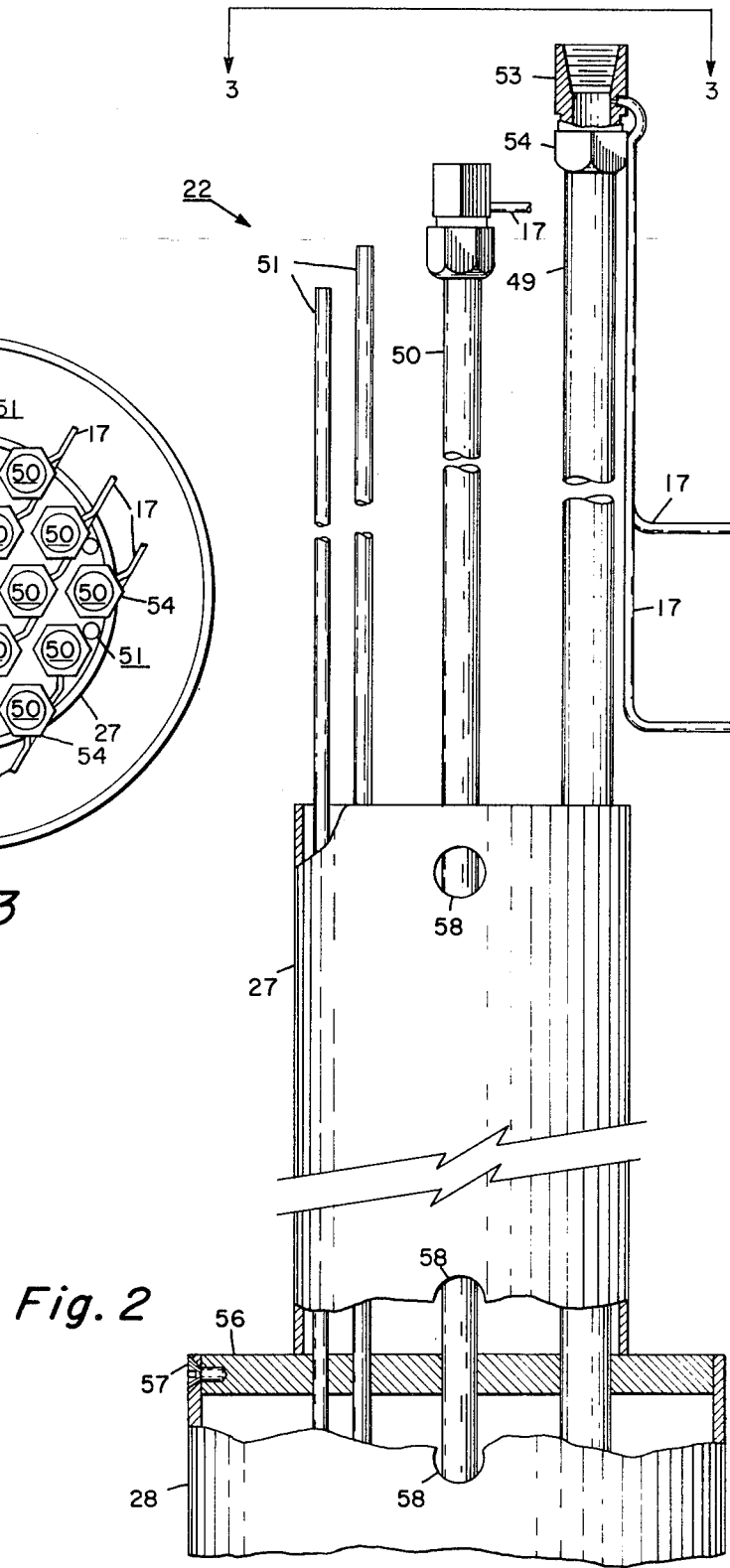
Fig. 3
Fig. 2

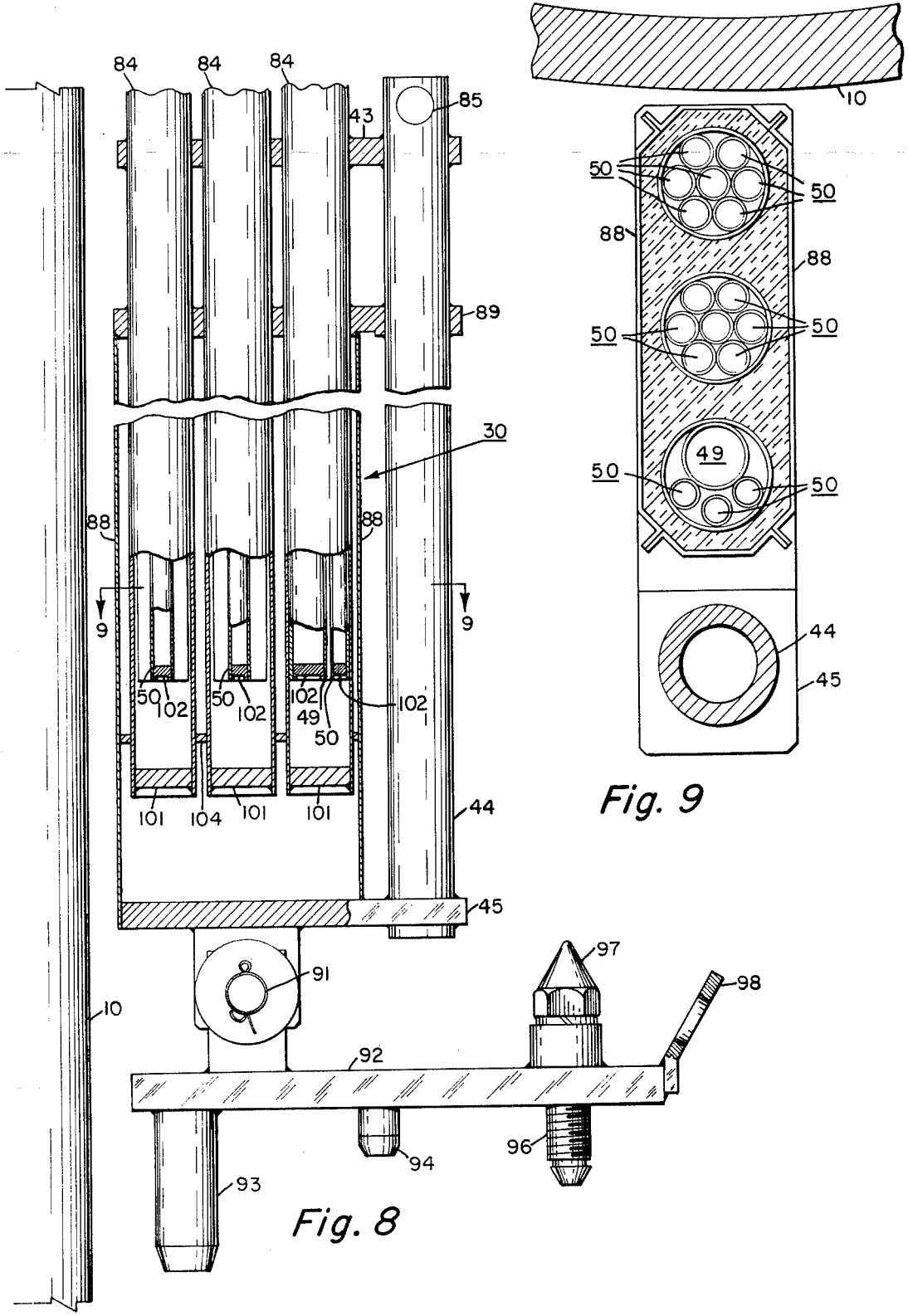

IRRADIATION TEST FACILITY

BACKGROUND OF THE INVENTION

Nuclear chain fission reactions and the reactors in which they take place are now well known. A typical nuclear reactor includes a chain reacting assembly or core made up of fissile nuclear fuel material contained in fuel elements. The fuel material is generally encased in a corrosion resistant heat conductive shell or cladding. The reactor core, made up of a plurality of these elements in spaced relationship, is enclosed in a container through which the reactor coolant flows. As the coolant passes between the spaced fuel elements, it is heated by thermal energy given off during the fission reaction. The heated coolant then leaves the reactor, the heat energy is used to perform useful work, such as by driving a turbine-generator set to produce electrical power, and the now-cooled coolant is recycled back to the reactor.

Development in the nuclear industry results in the need for easily accessible sources of radiation for studying the behavior of instruments, materials, etc. under irradiation. Modern power reactors include a number of in-core instruments to monitor certain reactor characteristics, such as local neutron flux levels, local temperature changes, etc. It is highly important that these instruments be tested and quality be assured before they are built into a power reactor. Similarly, it is desirable that new fuel compositions, structural materials, etc., be extensively tested before they are incorporated in a large power reactor. These tests should approximate actual reactor operating conditions as closely as possible.

Various test reactors, generally of the "swimming pool" type in which a water pool surrounds the reactor core, have been constructed with provision for irradiating test samples in or adjacent to the core. Generally, ducts are provided through which the sample is passed to the irradiation zone.

While these test facilities are often useful, they do not duplicate operating power reactor conditions to the degree desired. Conditions within a typical boiling water reactor core are especially difficult to approximate in these test reactors. Also, test reactors generally do not permit temperature and pressure to be varied independently of reactor power level. While several experiments are being conducted simultaneously, a change in reactor power level in accordance with the requirements of one experiment may adversely affect another experiment.

Thus, there is a continuing need for improved irradiation test facilities which more closely duplicate power reactor operating conditions and which are capable of varying test environmental conditions within wide ranges independent of the test reactor power level.

SUMMARY OF THE INVENTION

It is, therefore, an object of this invention to provide an irradiation test facility devoid of the above-noted problems.

Another object of this invention is to provide an irradiation test facility in which the test environment may be varied independently of reactor power level.

Still another object of this invention is to provide an irradiation test facility in which boiling water reactor core conditions can be substantially duplicated.

A further object of this invention is to provide an irradiation test facility in which test temperatures may be accurately controlled and varied within a wide range.

The above objects, and others, are accomplished in accordance with this invention by providing an irradiation test facility which includes a gamma ray heated, pressurized boiler and reflux condenser system which provides an inherently stable temperature control system. A plurality of sample irradiation stations are provided adjacent to the core of a test reactor. Different stations may be operated at different controlled temperatures within a wide range, and may be maintained wet or dry as desired. Water boiling may be permitted within selected test stations, as desired, to closely duplicate conditions within a boiling water reactor core.

BRIEF DESCRIPTION OF THE DRAWING

Details of the invention and of a specific preferred embodiment thereof will be further understood upon reference to the drawing, wherein:

FIG. 2 shows in elevation a partially cut away detail view of the upper portion of the device;

FIG. 3 shows a section through the showing of FIG. 2, taken on line 3—3 in FIG. 2;

FIG. 8 shows in elevation a partially cut away view of the lowest portion of the device;

FIG. 9 shows a sectional view taken on line 9—9 in FIG. 8;

DETAILED DESCRIPTION OF THE INVENTION

Figure 1A:
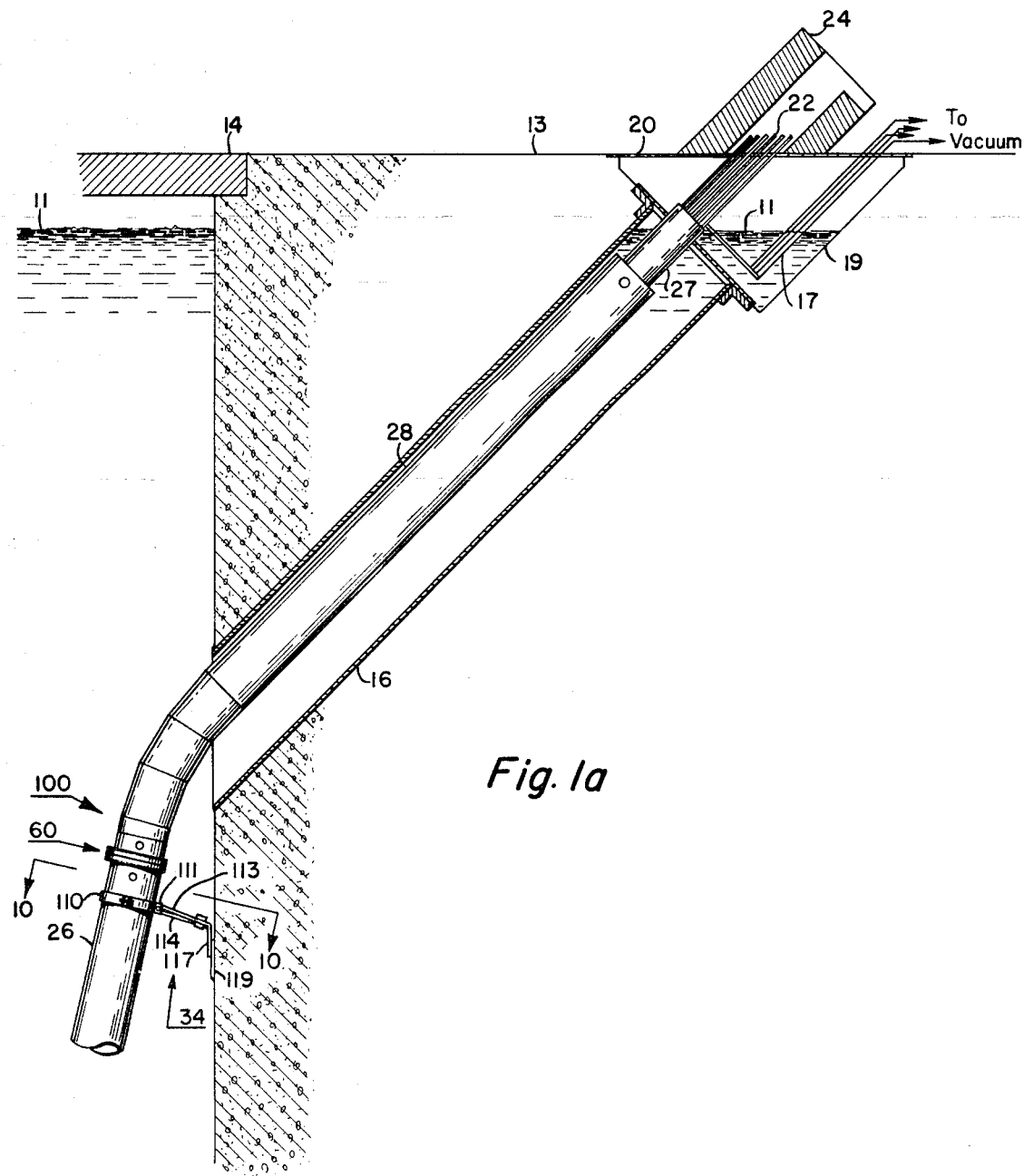
FIG. 1 shows an elevation view of the irradiation device within a reactor.

Referring now to FIG. 1, the irradiation device generally designated 100 is seen positioned near the core of a conventional "swimming pool" type nuclear reactor. The reactor pressure vessel 10 is surrounded by water, to a level indicated at 11 and is supported by a conventional support (not shown) extending up from the bottom of the pool. Within pressure vessel 10 is located the reactor core, schematically indicated by dashed lines 12. The pool is contained within a concrete vessel 13. The top of the pool is generally closed during reactor operation by a missile shield 14.

Irradiation device 100 enters the pool through an angled, metal-lined, tube 16 through the wall of concrete vessel 13. Tube 16 is filled with water up to water level 11. The upper end of tube 16 is enlarged at 19 to allow room for instrumentation lines in vacuum tubes 17, etc. Enlarged section 19 is closed at the top by a closure plate 20 having openings through which tubular means in the form of guide tubes 22 and vacuum tubes 17 pass. Samples to be irradiated are introduced through guide tubes 22, while pressure is regulated by vacuum tubes 17 which remove potentially radioactively contaminated gases or vapors. Shield 24 surrounds the ends of guide tubes 22.

Guide tubes 22 enter tube 27 and pass downwardly through an upper shroud tube 28 and a lower shroud tube 26. Several of the guide tubes 22 stop at the lower end of lower shroud tube 26 inside pressure tubes 29. As is further discussed below, these tubes are used for admitting water and for system pressurization. The remaining guide tubes 22 are divided into three groups and pass downwardly through three pressure tubes 29. The guide tubes finally enter irradiation chamber 30 adjacent core 12.

Figure 10:
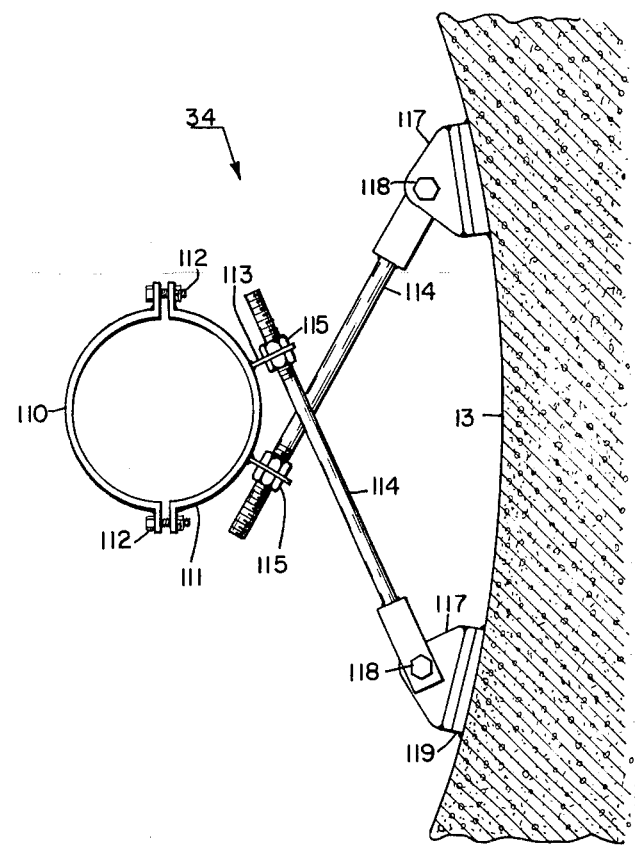
FIG. 10 is a sectional view showing the intermediate support structure, taken on line 10—10 in FIG. 1.

Shroud tube 28 is mounted on concrete vessel 13 by means of a tie structure 34, shown in detail in FIG. 10.

Pressure tubes 29 are mounted on concrete vessel 13 by means of an adjustable support 35 which includes a clamp means 36 which conforms to the shape of pressure tubes 29. Clamp 36 is secured to a right-hand threaded rod 37 which is threaded into an internally threaded tube 39. A second, left-hand, threaded rod 40 is threaded into the opposite end of tube 39 and is pivotably connected to a bracket 41 secured to the wall of concrete vessel 13. The location of clamp 36 may be adjusted by rotating tube 39, which operates in the manner of a turnbuckle.

Irradiation chamber 30 is mounted on a bracket which includes plates 43, tie rods 44 and a lower plate 45 which is removably mounted on a fixed ring 46 which surrounds reactor pressure vessel 10.

In operation, as is described in detail below, samples or instruments to be irradiated are conducted down through guide tubes 22 to irradiation chamber 30 by means of a retrieval wire or cord. Pressure tubes 29 are at least partially filled with water and back-pressure in tubes 29 is appropriately adjusted to provide the desired test temperature.

Details of the upper end of the facility are seen in FIGS. 2 and 3. FIG. 2 shows an enlarged side view of the upper portion. Only a few of the guide tubes are shown in this view, and the drawing is shortened and partly cut away, for clarity. FIG. 3 shows an end view of the guide tube assembly, taken on line 3—3 in FIG. 2.

As is most clearly shown in FIG. 3, in the embodiment shown guide tubes 22 include one large diameter sample tube 49, 16 standard size sample tubes 50 and six fill tubes 51.

Fill tubes 51 are used for the introduction of water and pressurizing gases into pressure tubes 29, as is further described below. Of course, different numbers of sample and fill tubes, of different sizes may be used, if desired. Fill tubes 51 are connected to the appropriate gas or water supply lines as indicated in the schematic diagram of FIG. 11. These conventional connecting lines are not shown in FIG. 2. Each of the sample tubes 49 and 50 is closed by a packing gland seal 53 such as "Conax" fitting which is secured to the sample tube by a nut 54. Conax fittings include a split plug (not shown) having a longitudinal hole through which the sample lift wire or cord passes. When the split plug is threaded into the fitting, the end of the sample tube is sealed.

A small diameter vacuum tube 17 is connected to each sample tube 49 and 50 near the upper end thereof. These tubes connect to a vacuum system and a contaminated gas handling system, to safely handle any radioactive gas which might be emitted by a failed test sample (such as a fuel sample being irradiated). Pressure within the sample tubes may be regulated by admitting a pressurizing gas through tubes 17. Also, where it is desired to irradiate the sample in a water environment, water may be admitted through tubes 17.

The group of guide tubes 22 pass downwardly through support tube 27, flange 56 and into upper shroud tube 28. Support tube 27 is fastened, as by welding, to flange 56, which is in turn secured to upper shroud tube 28 by a plurality of radially spaced screws 57. Both tubes 27 and 28 have a plurality of holes 58 to permit cooling and shielding water from the reactor pool to circulate among guide tubes 22.

Guide tubes 22 continue downwardly within upper shroud tube 28 until they reach a connection section 60. Connection section 60 permits the entire assembly to be divided into two portions, so that the assembly above this connection can be lifted out through tube 16 and the assembly below this connection can be lifted straight up out of the reactor pool.

Figure 4:
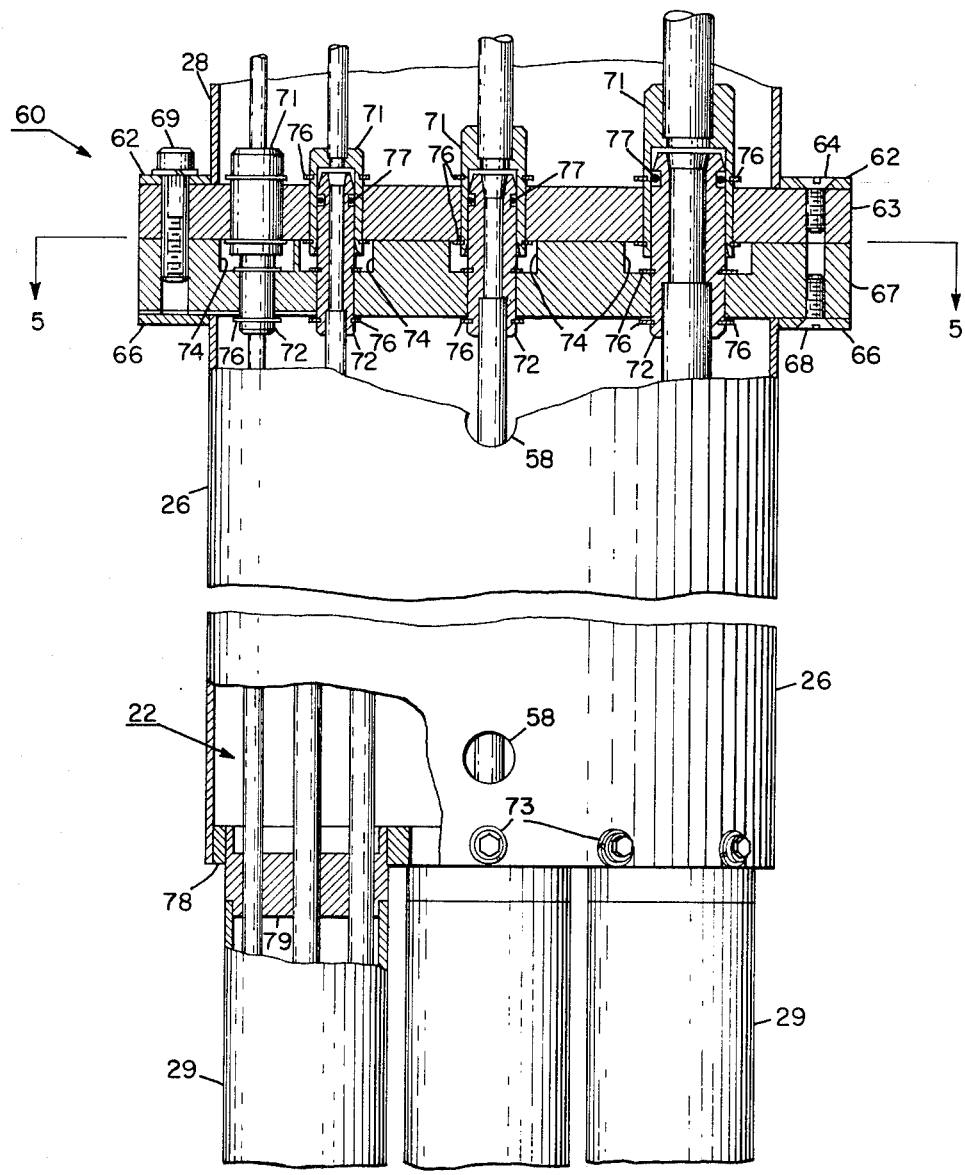
FIG. 4 shows in elevation a partially cut away view of the upper central portion of the device.
Figure 5:
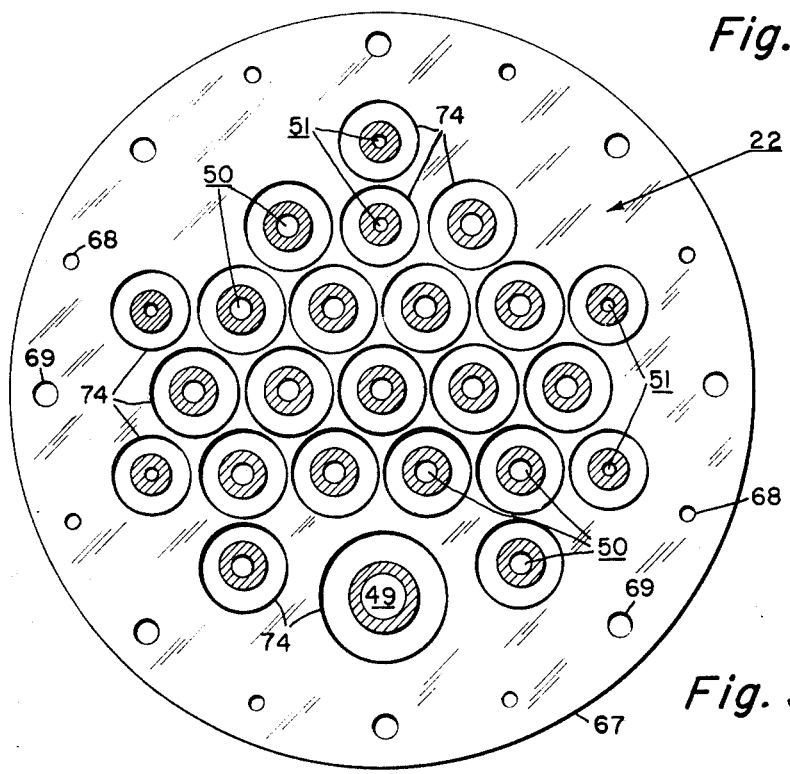
FIG. 5 shows a sectional view taken on line 5—5 in FIG. 4.

FIG. 4 shows a detailed elevation view of connection section 60, partly cut away for clarity. Only a few guide tubes 22 are shown in this view for clarity. The relative location of all guide tubes 22 at this location is shown in FIG. 5, a section taken through connection section 60.

Upper shroud tube 28 is fastened, such as by welding, to a thin ring flange 22. Flange 62 is removably fastened to a thick support flange 63 by a plurality of screws 64. Similarly, lower shroud tube 26 is fastened to a thin ring flange 66, which is in turn secured to a thick support flange 67 by screws 68. Alternating with screws 64 and 68 around flanges 67 and 63 are a plurality of bolts 69 which removably secure support flanges 63 and 67 together.

Flanges 63 and 67 have a plurality of coaxial holes in which fittings which removably connect guide tubes 22 are slidably positioned.

These fittings each include an outer sleeve 71, connected to the upper portion of each guide tube 22 and extending into recesses 74 within the surface of flange 67, and an inner sleeve 72 connected to the lower portion of each guide tube 22 and telescoping within each outer sleeve 71. These fittings permit guide tubes 22 to be easily separated when flanges 63 and 67 are separated. Also, the sliding telescoping fit of sleeve 72 within sleeve 71 accommodates differential thermal expansion which may result when some of the guide tubes 22 are heated to different temperatures during irradiation experiments.

A plurality of snap rings 76 are provided in annular recesses in sleeves 71 and 72 to hold them in position with respect to flanges 63 and 67. This loose fit of sleeves 71 and 72 in holes in flanges 63 and 67 further helps accommodate varying thermal expansion in the system.

Each inner sleeve 72 includes an O-ring 77 in an annular recess to seal the space between sleeve 72 and sleeve 71.

The lower end of lower shroud tube 26 is fastened by bolts 77 to a flange 78 having holes through which guide tubes 22 pass. Tubes 22 enter three pressure tubes 29 through those flanges 79, each of which is 178 is provided in the line below valve 177. Pressure in the system is observed on gauge 179. In operation, valve 175 is opened and pressure regulator 176 is set at the desired pressure. Valve 177 is opened while vent valve 178 is maintained closed. At the end of the experiment, valve 177 is closed and vent valve 178 is opened. Gas from the sample tube is conducted to the experiment exhaust system, which may include a vacuum pump and conventional gas decontamination system (not shown) to remove all of the pressurizing gas and any radioactive gases which may have leaked from samples, such as fuel, which had been irradiated in the sample tube.

A thermocouple 180 is provided within one of guide tubes 22 (preferably in one of fill tubes 51) to monitor the temperature in the irradiation zone.

If desired, water may be placed in any of the sample tubes 50 merely by removing the "Conax" closure fitting and pouring the water into the sample tube.

The entire system is now ready for reactor operation. While the above description referred only to the system involving the first pressure tube, the other two pressure tubes include the same sub-systems. The system schematically shown within dashed lines 181 around the first pressure tube would also be included within dashed lines 182 and 183 for the other two pressure tubes.

As reactor start-up begins, main nitrogen valve 164, main water valve 153 and nitrogen valve 154 are closed and valves 153, vent valves 155, and crossover valves 167 are open. Thermocouple 180 is monitored as reactor start-up proceeds. The temperature rises to about 212°F, then levels off. The discharge line from back pressure regulator 169 to the system exhaust does not get substantially above room temperature.

After the reactor has reached about 20 Mw, the facility is capable of reaching and maintaining any temperature from about 212°F to about 650°F by increasing the system pressure. Pressure is increased by first closing vent valve 155 and opening nitrogen valves 164 and 154. Nitrogen pressure regulator 158 is set at about 200 psig on gauge 162. Valve 159 is opened and then valves 154 and 159 are closed. Back pressure regulator 169, connected to the 200 psig nitrogen line, will maintain the pressure in the system. Within about 30 minutes the temperature will stabilize at about 388°F. As desired, pressure may be increased to achieve temperatures as follows: 400 psig gives about 448°F; 600 psig gives about 489°F; 800 psig gives about 250°F and 1,000 psig gives about 546°F.

A uniform, steady temperature is maintained by the boiler-reflux condenser action of the system. Water in the insulated, gamma heated section boils and steam rises into the upper condenser section where the pressure tubes are surrounded by the water pool. Heat is given up to the pool, and the steam condenses and returns to the lower section.

A pressure relief valve 185 is provided to prevent system pressure rising about a safe limit, such as 1,200 psig.

Temperature in the irradiation zone may be decreased by venting slowly with vent valve 155.

If the reactor is scrammed or shut down for a short period, no operator action is required. The facility will decrease in pressure and temperature due to lack of heating. However, when the reactor is restarted, the facility will recover to the same conditions.

The sample tubes may be maintained at any desired pressure by means of valves 175 and 177 and pressure regulator 176. The pressure may be set to permit boiling within the sample tube, with steam rising into the upper portion of the sample tube, to the point above the top of pressure tubes 29 where the sample tubes are in direct contact with the reactor pool water. Heat will there be transferred to the pool, and the steam will condense and return to the irradiation zone. Boiling may be suppressed, if desired, by maintaining pressure within the tube above about 1,300 psig. Thus, conditions within each sample tube may be varied widely. A sample tube may be operated dry at any desired pressure, or wet to simulate core conditions in boiling water and pressurized water type reactors. Boiling may also be permitted within water-containing sample tubes, for example, to simulate boiling water reactor conditions.

Although specific temperatures, pressures, materials, arrangements and proportions have been described in the above detailed description of a preferred embodiment, other suitable parameters and components may be used, as indicated above, with similar results.

Other modifications and ramifications of the present invention will occur to those skilled in the art upon reading the present disclosure. These are intended to be included within the scope of this invention.

I claim:

1. An irradiation test facility for high temperature use disposed within a nuclear reactor having a reactor pressure vessel, comprising:
   a. a plurality of tubular means extending from an accessible position external to a vessel wall surrounding the nuclear reactor through a water containing space between the vessel wall and the nuclear reactor to a position adjacent a nuclear chain reacting core of the nuclear reactor and external to the reactor pressure vessel;
   b. means permitting samples to be inserted into the plurality of tubular means;
   c. irradiation chamber means enclosing a portion of at least some of the plurality of tubular means and receiving radiation from the nuclear chain reacting core;
   d. pressure tube means containing water surrounding a portion of at least some of the tubular means in a pressure tight connection including the portion of the tubular means enclosed in the irradiation chamber means, with the portion of the pressure tube means enclosed in the irradiation chamber means acting as a boiler to provide a stable selected temperature in the tubular means, and with a portion of the pressure tube means removed from the irradiation chamber means acting as a condenser; and
   e. means to vary pressure in said pressure tube means whereby the temperature in said pressure tube means and in the portion of said plurality of tubular means adjacent said core may be varied.

2. The test facility according to claim 1 further including means permitting liquid to be introduced into at least one of said plurality of tubular means and means to vary pressure within said at least one of said plurality of tubular means.

sealed to flange 78 as by welding or brazing. Each of tubes 22 is sealed to flanges 79, as by brazing. Thus pressure generated in pressure tubes 29 will not leak past flanges 78 and 79 into lower shroud tube 26.

Figure 1B:
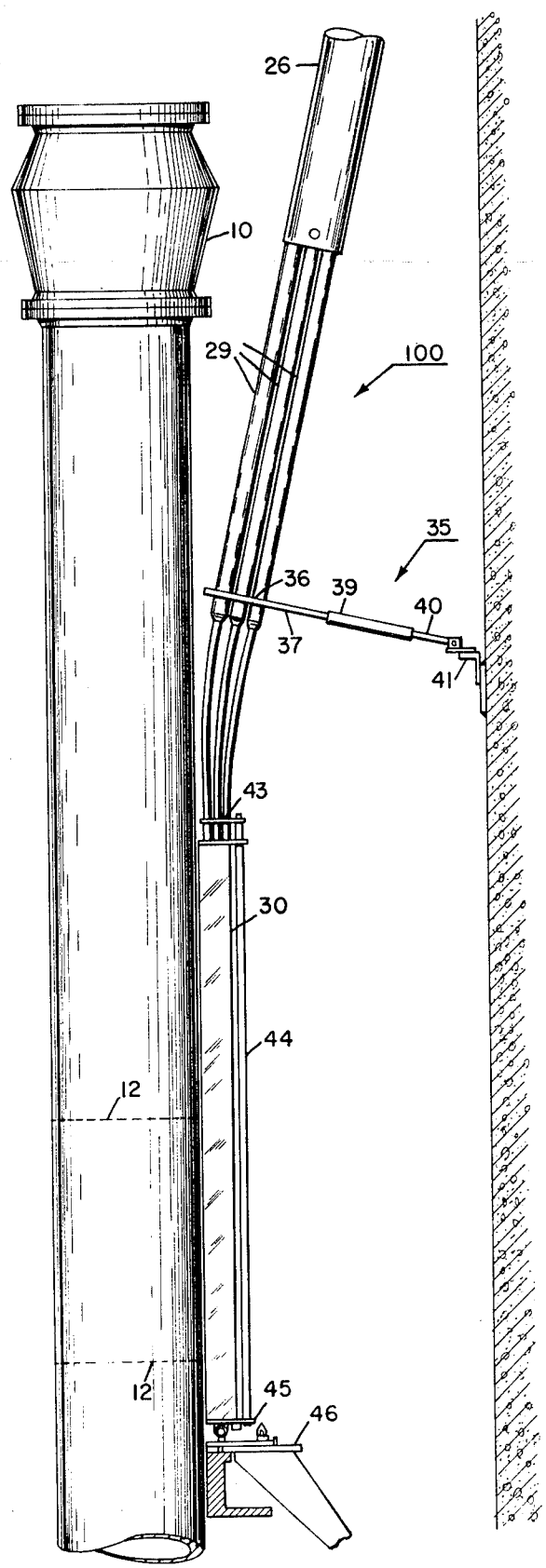
Figure 6:
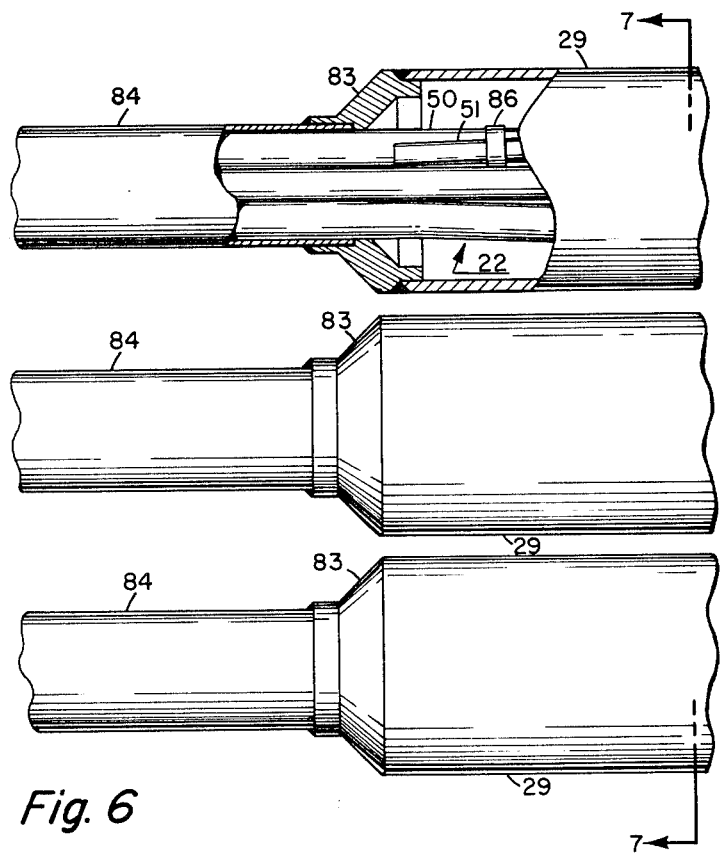
FIG. 6 shows in elevation a partially cut away view of the lower central portion of the device.

As pressure tubes 29 continue downwardly, they decrease in diameter as shown in detail in FIGS. 6 and 7 at a point just below support 35, as shown in FIG. 1b.

Reducing collars 83 connect the lower ends of pressure tubes 29 to the upper ends of pressurized irradiation tubes 84 which surround guide tubes 22 for the portions of each tube in irradiation chamber 30.

Fill tubes 51 end just above collars 83. The lower ends of fill tubes 51 are open, so that water may be introduced into irradiation tubes 84 around sample tubes 49 and 50. Fill tubes 51 are held in place by straps 86 which tie the ends of fill tubes 51 to an adjacent sample tube 50.

Figure 7:
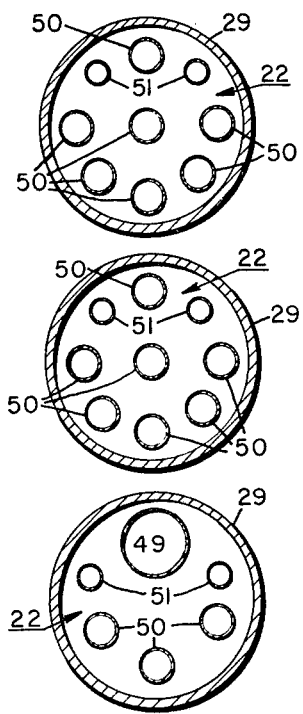
FIG. 7 shows a sectional view taken on line 7—7 in FIG. 6.

FIG. 7 shows the relative position of the various guide tubes 22 within pressure tubes 29 just above reducing collars 83.

Irradiation chamber 30 is shown in detail in FIG. 8, shortened and partly cut away for clarity. A horizontal section through irradiation chamber 30 is shown in FIG. 9.

Irradiation chamber 30 is generally rectangular in shape, enclosed by side walls 88, a lower plate 45 and an upper flange 89 through which pressurized irradiation tubes 84 pass. A tie rod 44 connects lower plate 45, upper flange 89 and an upper plate 43 to add rigidity to irradiation chamber 30. A lifting hole 85 is provided at the upper end of tie rod 44.

Lower plate 45 is fastened by a pin 91 to a mounting bracket 92. Bracket 92 has a pair of downwardly extending projections 93 and 94 which fit holes in a fixed ring 46 around the reactor (as seen in FIG. 1b). Bracket 92 is fastened to fixed ring 46 by a bolt 96. Bolt 96 has a conical head 97, facilitating operation by a remote manipulating device operated from above the reactor pool surface. A tab 98 having a hole therethrough is provided to permit bracket 92 to be lifted after bolt 96 is disconnected.

Each pressurized irradiation tube 84 is plugged just above the bottom of irradiation chamber 30 by a plug 101. Similarly, each sample tube 49 and 50 is plugged just above the bottom of each tube 84 by a plug 102. Tubes 84 are maintained in the proper spaced relationship by a spacer 104 which is secured to the center irradiation tube 84 but not to side walls 88 of irradiation chamber 30, to accommodate differential thermal expansion.

The space around pressurized irradiation tube 84 within irradiation chamber 30 is filled with a thermal insulation material, such as quartz wool. As is seen in FIG. 9, there is a space around sample tubes 49 and 50 within irradiation tubes 84 which is at least partially filled with water.

If desired, drain lines may be provided extending from above the reactor pool surface to the bottom of irradiation chamber 30 and/or the bottom of each irradiation tube 84 so that water may be removed, if desired.

FIG. 10 shows a detailed sectional view of the upper tie structure 34, taken on line 10—10 in FIG. 1a. Only the support structure is shown in FIG. 10; shroud tube 26 and guide tubes 22 are not shown in this figure.

Tie structure 34 includes a pair of semi-circular straps 110 and 111 adapted to surround shroud tube 26 (as seen in FIG. 1). A pair of bolts 112 serve to tightly clamp straps 110 and 111 to shroud tube 26. A pair of brackets 113 which are fastened to strap 111 have holes through which threaded tie rods 114 pass. A pair of nuts 115 on each tie rod 114 abut brackets 113 and hold them in the desired position. The opposite end of each tie rod 114 is pivotably connected to a mounting bracket 117 by a bolt 118. Each mounting bracket 117 is fastened to a plate 119 secured to the wall of the reactor pool.

Thus, the position of shroud tube 26 may be easily adjusted by moving nuts 115 along threaded portions of tie rods 114. Shroud tube 26 may be released for removal from the pool by removing bolts 112. Since this does not disturb the position of strap 111, shroud tube 26 may be replaced in the exact same position.

Figure 11:
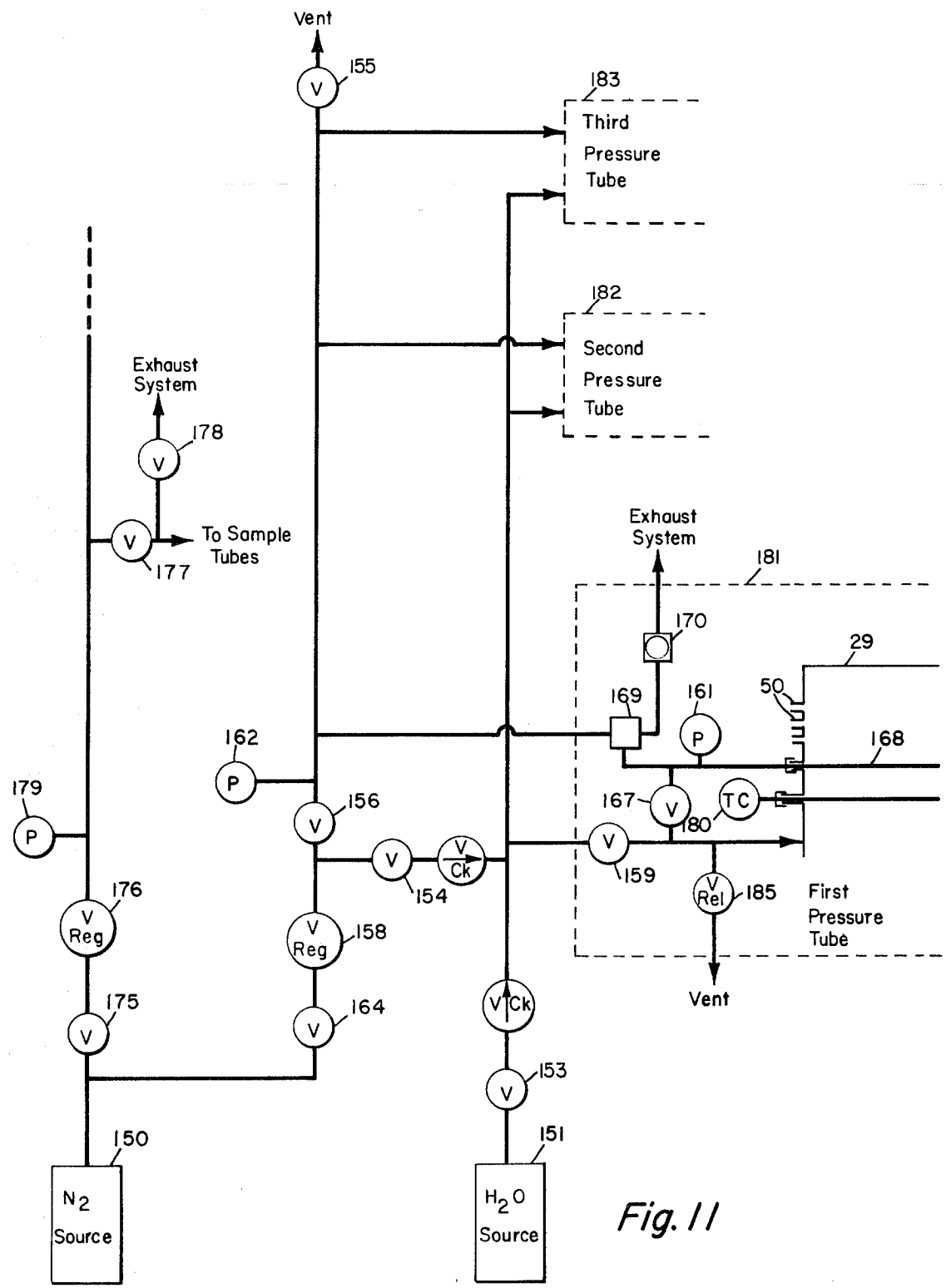
FIG. 11 shows a simple schematic diagram of the pressurizing and temperature control system for a typical irradiation tube.

A schematic representation of the pressurization and temperature control system is shown in FIG. 11. Initial pressurization is accomplished by conducting a gas such as nitrogen from a high pressure source 150 to the desired tube or tubes. Water is directed to the pressure tubes from a high pressure water source 151.

Before reactor start-up, valve 153 in the water line, valve 154 in the nitrogen line and valve 155 in the system vent line are all closed and valve 156 in the nitrogen line is opened with nitrogen pressure regulator 158 turned down.

The system is prepared for operation by slowly opening valve 154 and valve 159. Pressure indicated by pressure gauge 161 should indicate nearly the same pressure as system pressure gauge 162. Nitrogen pressure regulator 158 is adjusted to about 1,000 psig while checking for leaks in the connecting pipes and tubes, then is returned to atmospheric pressure. Then valves 164 and 154 are closed and vent valve 155 is opened to vent the system to the atmosphere.

Next, the pressure tubes 29 are each filled with water to the proper level. Valves 164, 154 and 156 in the nitrogen line are closed, as is crossover valve 167. Vent valve 155 is opened. Water line valves 153 and 159 are opened, permitting water to flow into first pressure tube 29. When the pressure tube is filled, water overflows through level control line 168, back pressure regulator 169, and sight glass 170 to the experiment exhaust system. Water may be allowed to run for several minutes to flush out the system. Then valve 153 is closed and nitrogen line valves 154 and 164 are opened with nitrogen pressure regulator 158 set at zero pressure. Then nitrogen pressure is increased up to about 100 psig. As the gas pressure increases, the gas forces water out of the pressure tube 29 until the bottom of level control tube 168 is exposed. Level control tube 168 is inserted in one of the two fill tubes 51. The water or nitrogen is admitted through the other fill tube 51. When water stops flowing through sight glass 170, pressure regulator 158 is backed off and nitrogen valves 164, 154 and 159 are closed.

Sample tubes 49 and 50 may be pressurized by gas from high pressure source 150, if desired. Nitrogen to a typical sample tube 50 passes through line valve 175 and pressure regulator 176 to a series of valves 177 in individual lines connected to individual sample tubes. Only one valve 177 is shown, for clarity. A vent valve 3. The test facility according to claim 1 wherein the pressure tube means comprises at least one gamma ray heated, thermally insulated, partially liquid filled pressure tube enclosing at least one of said plurality of tubular means and an extension of said pressure tube within said water containing space is disposed in heat exchanging relationship with water in said water containing space.

4. The test facility according to claim 1 further including detachable thermal expansion accommodating joints at a point between the accessible position external to the vessel wall surrounding the nuclear reactor and the position adjacent the nuclear chain reacting core, which joints permit said facility to be separated into two parts for removal from the reactor region.

5. The test facility according to claim 1 including at least two of said pressure tube means each of which surrounds at least two tubular means and means permitting the maintenance of different temperature and pressure conditions in each pressure tube means and in each tubular means.

6. The system according to claim 1 including at least two of said pressure tubes each of which surrounds at least two tubular means and means permitting the maintenance of different temperature and pressure conditions in each pressure tube and in each tubular means.

* * * * *

UNITED STATES PATENT OFFICE
CERTIFICATE OF CORRECTION

Patent No. 3,719,555    Dated March 6, 1973

Inventor(s) Grover L. Davis

It is certified that error appears in the above-identified patent and that said Letters Patent are hereby corrected as shown below:

Column 4, line 31, "flange 22" should be --flange 62--; and line 65, "bolts 77" should be --bolts 73--. Column 5, lines 10 and 11, replace "for the portions of each tube in" with --including the portion of each tube 22 in--. Column 7, line 31, "valves 153" should be --valve 156--; and "valves 155" should be --valve 155--.

Signed and sealed this 20th day of November 1973.

(SEAL)
Attest:

EDWARD M. FLETCHER, JR.
Attesting Officer

RENE D. TEGTMEYER
Acting Commissioner of Patents